(12) United States Patent
Kaltenrieder et al.

(10) Patent No.: US 11,504,907 B2
(45) Date of Patent: Nov. 22, 2022

(54) EXTERNAL COMPONENT MADE OF COMPOSITE MATERIAL AND METHOD FOR MANUFACTURING THE SAME

(71) Applicant: The Swatch Group Research and Development Ltd, Marin (CH)

(72) Inventors: Cedric Kaltenrieder, Courtelary (CH); Gilles Vuilleumier, Bienne (CH)

(73) Assignee: The Swatch Group Research and Development Ltd, Marin (CH)

( * ) Notice: Subject to any disclaimer, the term of this patent is extended or adjusted under 35 U.S.C. 154(b) by 813 days.

(21) Appl. No.: 16/400,326

(22) Filed: May 1, 2019

(65) Prior Publication Data

US 2019/0358898 A1   Nov. 28, 2019

(30) Foreign Application Priority Data

May 24, 2018   (EP) .................................... 18174167

(51) Int. Cl.
*B29C 64/165*   (2017.01)
*B33Y 10/00*   (2015.01)
(Continued)

(52) U.S. Cl.
CPC .......... *B29C 64/165* (2017.08); *A44C 27/002* (2013.01); *B33Y 10/00* (2014.12); *B33Y 70/00* (2014.12); *B33Y 80/00* (2014.12); *G04B 19/042* (2013.01); *G04B 19/12* (2013.01); *G04B 19/18* (2013.01); *G04B 37/225* (2013.01);
(Continued)

(58) Field of Classification Search
None
See application file for complete search history.

(56) References Cited

U.S. PATENT DOCUMENTS

| 6,630,093 B1 * | 10/2003 | Jones ................... B29C 70/088 700/118 |
| 2007/0184288 A1 * | 8/2007 | Garamszegi ............ B29C 67/24 428/447 |
| 2012/0192424 A1 | 8/2012 | Cataldo et al. |

FOREIGN PATENT DOCUMENTS

| CH | 712 488 A2 | 11/2017 |
| EP | 2 316 299 A1 | 5/2011 |

(Continued)

OTHER PUBLICATIONS

European Search Report dated Nov. 26, 2018 in European Application 18174167.9 filed on May 24, 2018 (with English translation of categories of Cited Documents).

(Continued)

*Primary Examiner* — Jeffrey D Washville
(74) *Attorney, Agent, or Firm* — Oblon, McClelland, Maier & Neustadt, L.L.P.

(57) ABSTRACT

A method for manufacturing an external component for horology or jewellery made of a composite material including a reinforcement formed of a preferably perforated structure and a matrix composed of a synthetic material, the method including the successive steps consisting in: a) making a 3D file of the reinforcement, b) forming the reinforcement by additive manufacturing, c) embedding all or part of the reinforcement in the synthetic material. An external component for horology or jewellery can be made of a composite material including a matrix composed of a synthetic material and a reinforcement having a perforated structure obtained by additive manufacturing.

18 Claims, 3 Drawing Sheets

(51) Int. Cl.
  *B33Y 70/00*    (2020.01)
  *B33Y 80/00*    (2015.01)
  *A44C 27/00*    (2006.01)
  *G04B 19/04*    (2006.01)
  *G04B 19/12*    (2006.01)
  *G04B 19/18*    (2006.01)
  *G04B 37/22*    (2006.01)
  *B29K 63/00*    (2006.01)
  *B29K 305/08*   (2006.01)
  *B29L 31/00*    (2006.01)

(52) U.S. Cl.
  CPC ...... *B29K 2063/00* (2013.01); *B29K 2305/08* (2013.01); *B29K 2995/0026* (2013.01); *B29L 2031/739* (2013.01)

(56) References Cited

FOREIGN PATENT DOCUMENTS

| | | |
|---|---|---|
| EP | 2 485 099 A2 | 8/2012 |
| EP | 2 316 299 B1 | 2/2013 |
| JP | 2008-020265 | 1/2008 |

OTHER PUBLICATIONS

Combined Chinese Office Action and Search Report dated Dec. 3, 2020 in corresponding Chinese Patent Application No. 201910422125.6 (with English Translation and English Translation of Category of Cited Documents), 11 pages.

\* cited by examiner

EXTERNAL COMPONENT MADE OF COMPOSITE MATERIAL AND METHOD FOR MANUFACTURING THE SAME

CROSS-REFERENCE TO RELATED APPLICATION

This application claims priority to European Patent Application No. 18174167.9 filed on May 24, 2018, the entire disclosure of which is hereby incorporated herein by reference.

FIELD OF THE INVENTION

The present invention relates to a method for manufacturing an external component for horology or jewellery made of composite material. It more particularly relates to a manufacturing method involving a step of 3D printing the reinforcement of the composite material. The present invention also relates to the external component for horology or jewellery made with the composite material.

PRIOR ART

For reasons of lightness, metal alloys can be replaced with plastic materials. To improve the properties of the plastic materials, reinforcements in the form of particles, fibres or a structure are used. There is known, for example, in the field of horology, the Swatch Skin watch, which has a metal structure inside its case middle. This reinforcement is produced by stamping, which has several drawbacks. Shaping the reinforcement requires expensive equipment, with a number of cutting, drawing, bending and cold working operations that increases with the complexity of the geometry to be created. Moreover, geometries that can be produced by stamping are limited. To make the watch lighter while maintaining the function of reinforcing the structure, more complex geometries, for example honeycomb shaped, may be desired.

SUMMARY OF THE INVENTION

It is therefore an object of the present invention to propose a method for manufacturing an external component for horology or jewellery that includes a reinforcement having a geometry that is chosen freely according to technical and/or aesthetic considerations.

To this end, the reinforcement is made by additive manufacturing. This makes it possible to produce a reinforcement having an optimised structure according to criteria of weight and strength, and possibly aesthetic criteria.

The reinforcement thereby obtained is then wholly or partly embedded in a synthetic material to give the component the desired final shape.

Other features and advantages of the present invention will appear in the following description of preferred embodiments, given by way of non-limiting example, with reference to the annexed drawings.

DETAILED DESCRIPTION

Figure 1A:
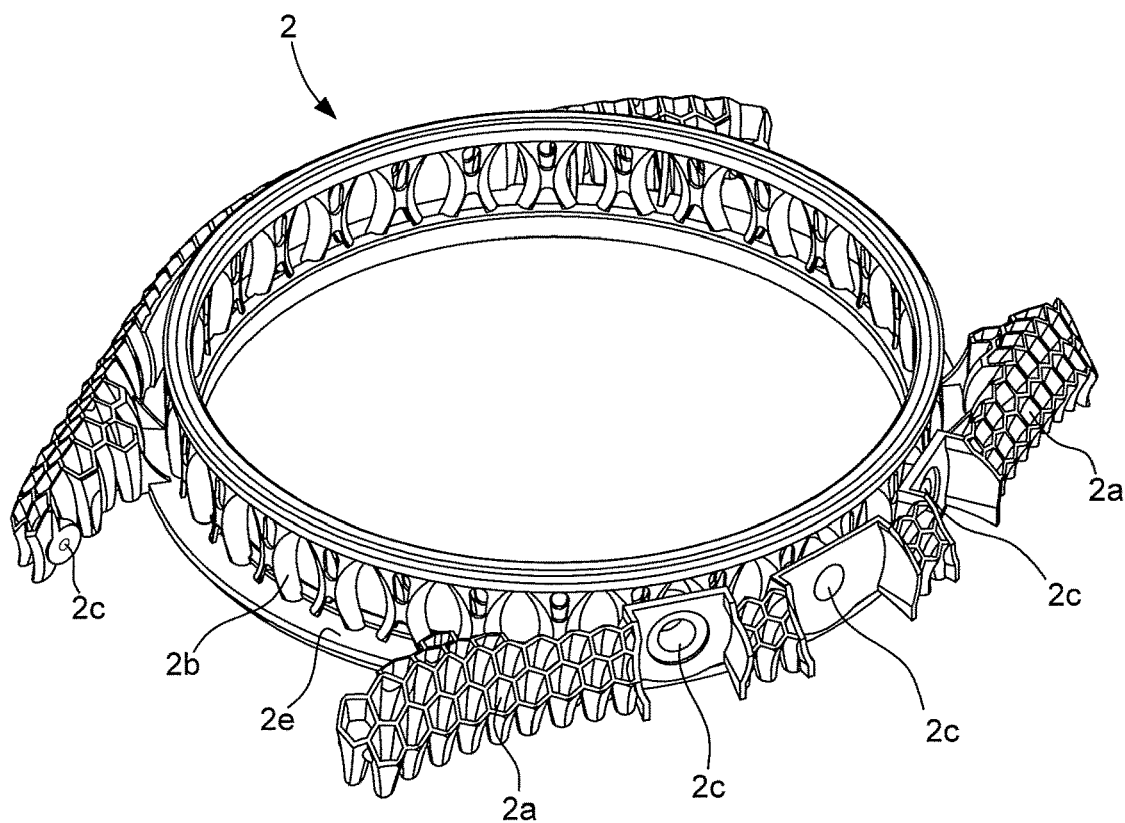
FIG. 1A represents a three-dimensional view of a reinforcement for a case middle made by additive manufacturing with the method of the invention.

The present invention relates to a method for manufacturing an external component for horology or jewellery made with a composite material including an organic matrix, which will be referred to more generally as a synthetic material, and a reinforcement. The external component may be a watch case, a case middle, a case back, a bezel, a bracelet, a bracelet link, a dial, a hand, a pusher, etc. By way of example, in FIGS. 1B and 2D it is a case middle 1. The object of the reinforcement, referenced 2, is to reinforce the matrix and/or give the component a particular aesthetic effect if the matrix is transparent. This one-piece reinforcement may have a virtually unlimited variety of geometries. It has the characteristic of forming a perforated structure to make the component lighter. As represented in FIG. 1A, reinforcement 2 may comprise all or part of a honeycomb structure. In the illustrated example, the honeycomb structure is disposed in portions 2a intended to form the horns of the watch case. It may also be formed of one or more perforated walls 2b as represented in FIGS. 1A and 2A. It may also include a base 2e surmounted by a perforated wall 2b for the variant of FIG. 1A. It may also include functional areas 2c: orifices, pivots, grooves, recesses, etc. for subsequent mounting on the component of added elements, such as bracelet attachments, pusher or crown tubes, the crystal, the bezel and the back cover. The reinforcement can be made of a metal alloy and advantageously of a titanium alloy or an aluminium alloy chosen for its low density. The reinforcement may also be made of ceramic (alumina, zirconia, etc.) or organic materials. In this latter case, the organic material of the reinforcement has superior mechanical properties to those of the matrix and is advantageously chosen from among the following polymers: PEEK (polyetheretherketone), ABS (Acrylonitrile butadiene styrene), PEI (polyethylenimine), PA (polyamide), these polymers could be carbon filled, for example a carbon filled polyamide such as that sold under the trade name Windform XT 2.0 by Windform, with silica, aluminium, for example an aluminium-filled polyamide powder, such as that sold under the trade name Alumide by Materialise, etc.

Figure 1B:
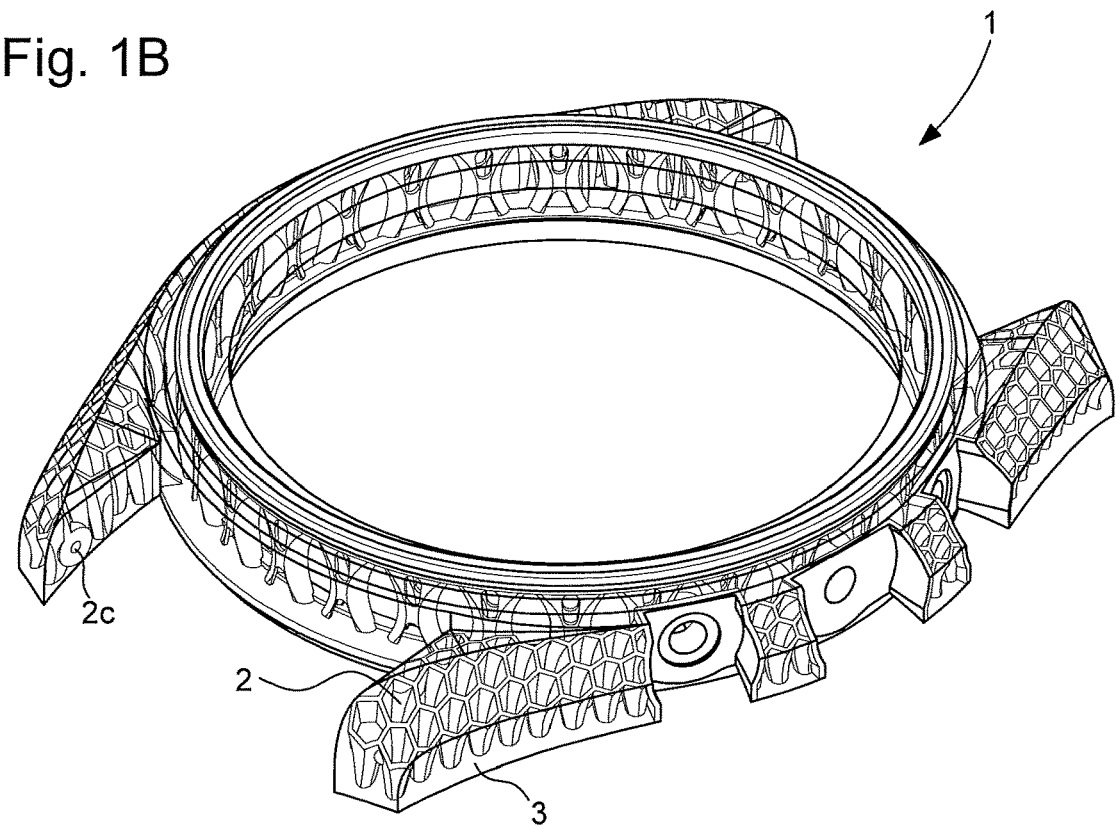
FIG. 1B represents the same reinforcement overmoulded with a synthetic material according to the method of the invention.
Figure 2A:
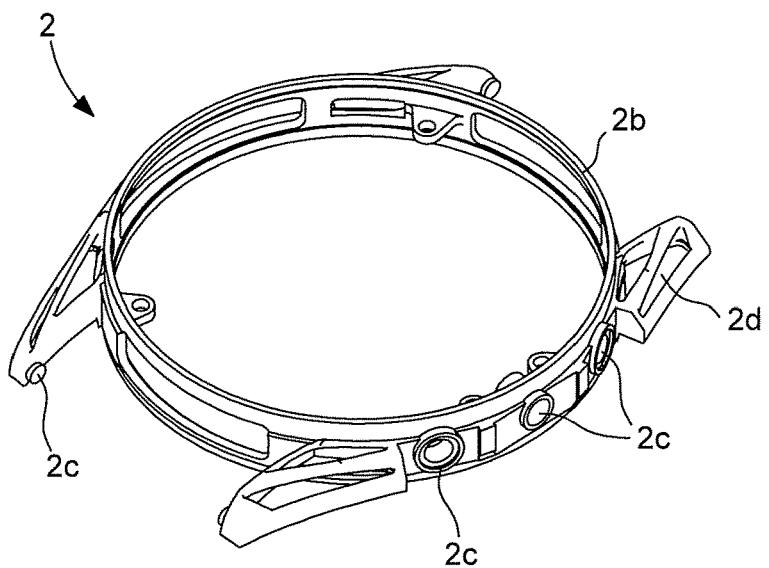
FIG. 2A represents a variant of the reinforcement of FIG. 1A with, in FIG. 2B, an additional step of mounting soluble or fusible cores in the reinforcement during the manufacturing process.
Figure 2B:
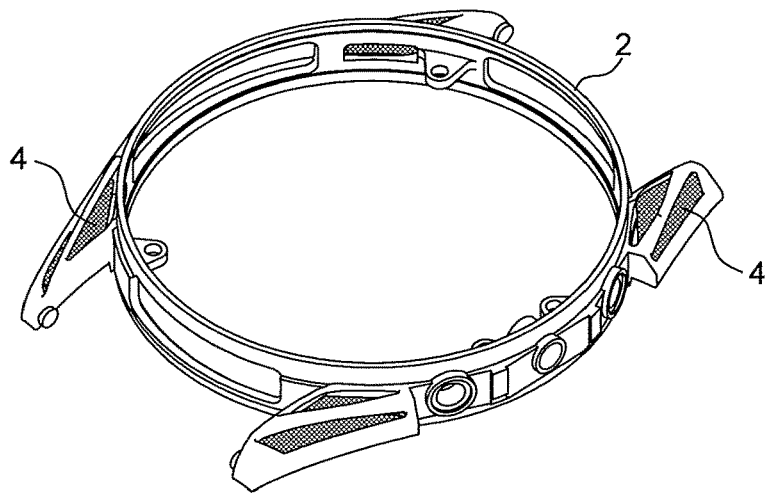
FIG. 2C represents, in a similar manner to FIG. 1B, the step of overmoulding the reinforcement provided with cores.
FIG. 2D represents the overmoulded reinforcement after dissolution or fusion of the cores.
Figure 2C:
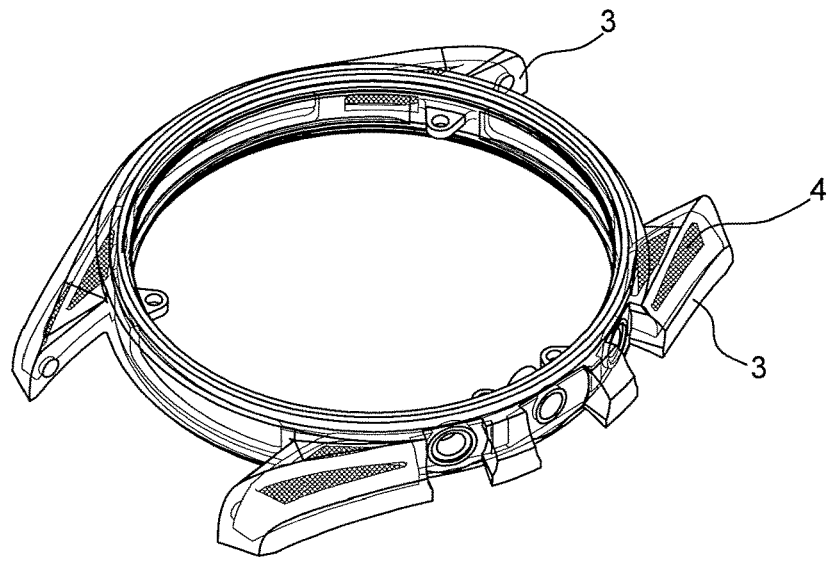
Figure 2D:
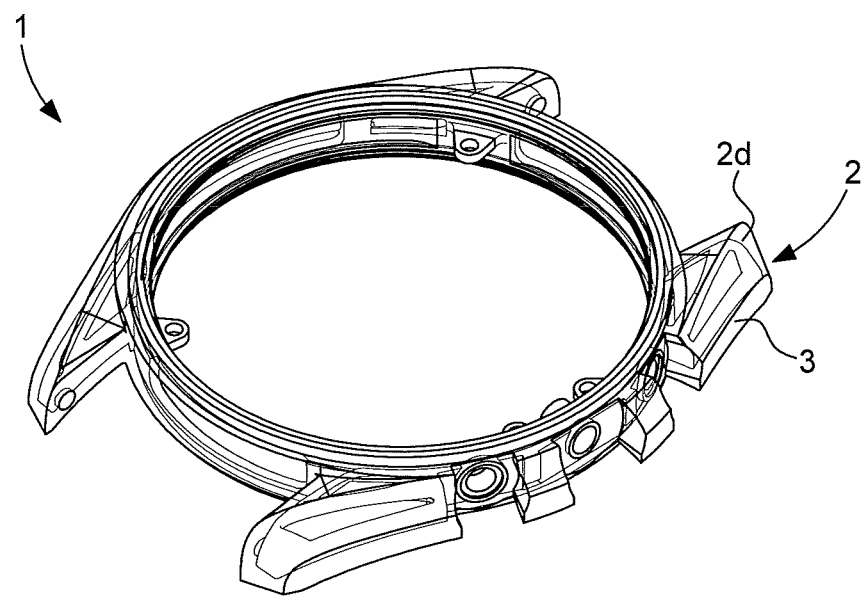

Reinforcement 2 is wholly or partly embedded in a synthetic material 3 forming the matrix of the composite material (FIG. 1B and FIG. 2D). The synthetic material may, for example, be a fluorinated elastomer (FK, FFKM), a polyurethane elastomer (PUR), a silicone, a thermoplastic elastomer (TPE) or a thermoset material, such as an epoxide. By way of example, the composite material can include an epoxy resin matrix coating a reinforcement made of an aluminium alloy. The synthetic material may be transparent, which makes it possible for the reinforcement to be seen inside the component.

According to a variant and in order to provide a particular aesthetic effect, the material of the matrix is mixed with a rare-earth-doped phosphorescent pigment of the alkaline earth oxide type. For example, the phosphorescent pigment may be strontium aluminate, strontium silicate, barium silicate or calcium silicate doped with europium and dysprosium.

The method for manufacturing the composite material according to the invention includes three steps consisting in (FIG. 1A and FIG. 1B):

a) Making a 3D file of the reinforcement structure, for example using a suitable programme like SolidWorks®. The geometry of the structure is chosen according to aesthetic and/or technical considerations. CAD topology optimisation tools can be used to define the geometry of this structure to minimise the quantity of material used and thus the mass of the structure. The structure can also be characterized to avoid as far as possible the use of printing supports during the manufacturing process.

b) Making reinforcement 2 by additive manufacturing (FIG. 1A). Numerous methods can be employed. In a non-exhaustive manner, the following printing processes can be cited: binder jetting, directed energy deposition, material extrusion, material jetting, powder-bed fusion, sheet lamination, vat photopolymerization. The reinforcement structure is formed by a stack of successive layers to obtain the final shape of the reinforcement. The layer effect may be negligible or non-existent for additive manufacturing technologies such as the Carbon Inc. 'CLIP' method (continuous liquid interphase production). For other technologies, such as, for example, those of mCor and Fabrisonic using sheet lamination, the thickness of the stacked layers is on the order of 0.1 to 0.2 mm.

c) Embedding all or part of reinforcement 2 in synthetic material 3 (FIG. 1B). The step consisting in embedding the reinforcement can be achieved by overmoulding, by injection moulding, coating or infiltration with the synthetic material intended to form the matrix. The synthetic material can cover and fill the entire perforated structure or alternatively only partially cover and fill the reinforcement. In this latter case, the reinforcement is then partially bare in the final product.

The manufacturing method can include an optional finishing step (not represented) performed on the reinforcement before step c). This can be a machining operation for the purpose of obtaining precise geometries and dimensions on the functional areas used for the subsequent assembly of added elements. The machining operation may also have an aesthetic purpose. This machining operation can be performed when the reinforcement is still on the printing support plate. It can also consist of surface treatments, such as laser structuring, anodization, PVD deposition, etc., for the purpose of protecting the reinforcement and/or improving its aesthetics. The manufacturing method can also include an optional finishing step, and more particularly a machining operation after step c) to obtain the desired final geometry. It is also possible to envisage manufacturing the reinforcement without functional areas and subsequently machining these areas on the component resulting from step c).

According to a variant of the method represented in FIGS. 2A to 2D, reinforcement 2 may include one or more cavities 2D intended to remain empty after step c). To this end, soluble or fusible cores 4 are mounted inside these cavities before step c) (FIG. 2B-FIG. 2C). They may be, for example, water soluble poly(vinyl alcohol) cores. After step c), cores 4 are dissolved or melted to free the cavities (FIG. 2D).

In the end, the external component is extremely light yet still strong owing to the perforated reinforcement embedded in the synthetic matrix. The aesthetic appearance of the component may also be adjusted by acting on the transparency of the synthetic matrix and the design of the reinforcement.

The invention claimed is:

1. A method for manufacturing an external component for horology or jewellery made of a composite material comprising a reinforcement formed of a structure and a matrix composed of a synthetic material, said method including the successive steps comprising:
   a) making a 3D file of the reinforcement,
   b) forming said reinforcement by additive manufacturing on the basis of the 3D file,
   c) embedding all or part of said reinforcement in the synthetic material,
   wherein the method further comprises, before step c), a step of inserting one or more fusible or soluble cores respectively in one or more cavities of the reinforcement intended to remain empty after step c), and
   after step c), a step of dissolving or melting the core or cores.

2. The method according to claim 1, wherein the reinforcement structure is perforated.

3. The method according to claim 1, wherein the method comprises a step of finishing the reinforcement between steps b) and c), the finishing step consisting of a machining step and/or a surface treatment step of the reinforcement.

4. The method according to claim 3, wherein the surface treatment step comprises structuring the surface of the reinforcement and/or in depositing a coating on the surface of the reinforcement.

5. The method according to claim 1, wherein the method comprises a finishing step after step c), the finishing step comprising a machining step to give the component its final geometry.

6. The method according to claim 1, wherein step c) is performed by overmoulding, coating or infiltration.

7. The method according to claim 1, wherein the reinforcement resulting from step b) comprises one or more honeycomb-shaped parts and/or one or more walls with perforations and/or one or more functional areas for mounting elements on the component.

8. The method according to claim 1, wherein the reinforcement comprises functional areas such as orifices, grooves, recesses, pivots, for the subsequent mounting of elements on the component.

9. The method according to claim 1, wherein the reinforcement is made of a ceramic, metal or organic material.

10. The method according to claim 1, wherein the reinforcement is made of a titanium alloy or an aluminium alloy.

11. The method according to claim 1, wherein the reinforcement is made of a polymer chosen from the list including PEEK, ABS, PEI and PA.

12. The method according to claim 1, wherein the matrix is made of a resin chosen from the list including a fluorinated elastomer, a polyurethane elastomer, a silicone, a thermoplastic elastomer or a thermoset material.

13. The method according to claim 1, wherein the matrix is made from an epoxy resin.

14. The method according to claim 1, wherein the synthetic material is transparent.

15. The method according to claim 1, wherein the component is chosen from a list including a watch case, a case middle, a case back, a bezel, a bracelet, a bracelet link, a dial, a pusher, and a hand.

16. The method according to claim 1, wherein the component is a case middle with the reinforcement having several honeycomb-shaped parts disposed on horns of the case middle.

17. The method according to claim 1, wherein the core or cores are water soluble poly(vinyl alcohol) cores.

18. The method according to claim 1, wherein the additive manufacturing of step b) is binder jetting, directed energy deposition, material extrusion, material jetting, powder-bed fusion, sheet lamination, or vat photopolymerization.

* * * * *